Feb. 17, 1942.    G. W. KEENE ET AL    2,273,203
POSTHOLE DIGGER
Filed Oct. 1, 1940    2 Sheets-Sheet 1

Inventors:
George W. Keene and
Karl R. Johnson,
By Banning & Banning
Attorneys

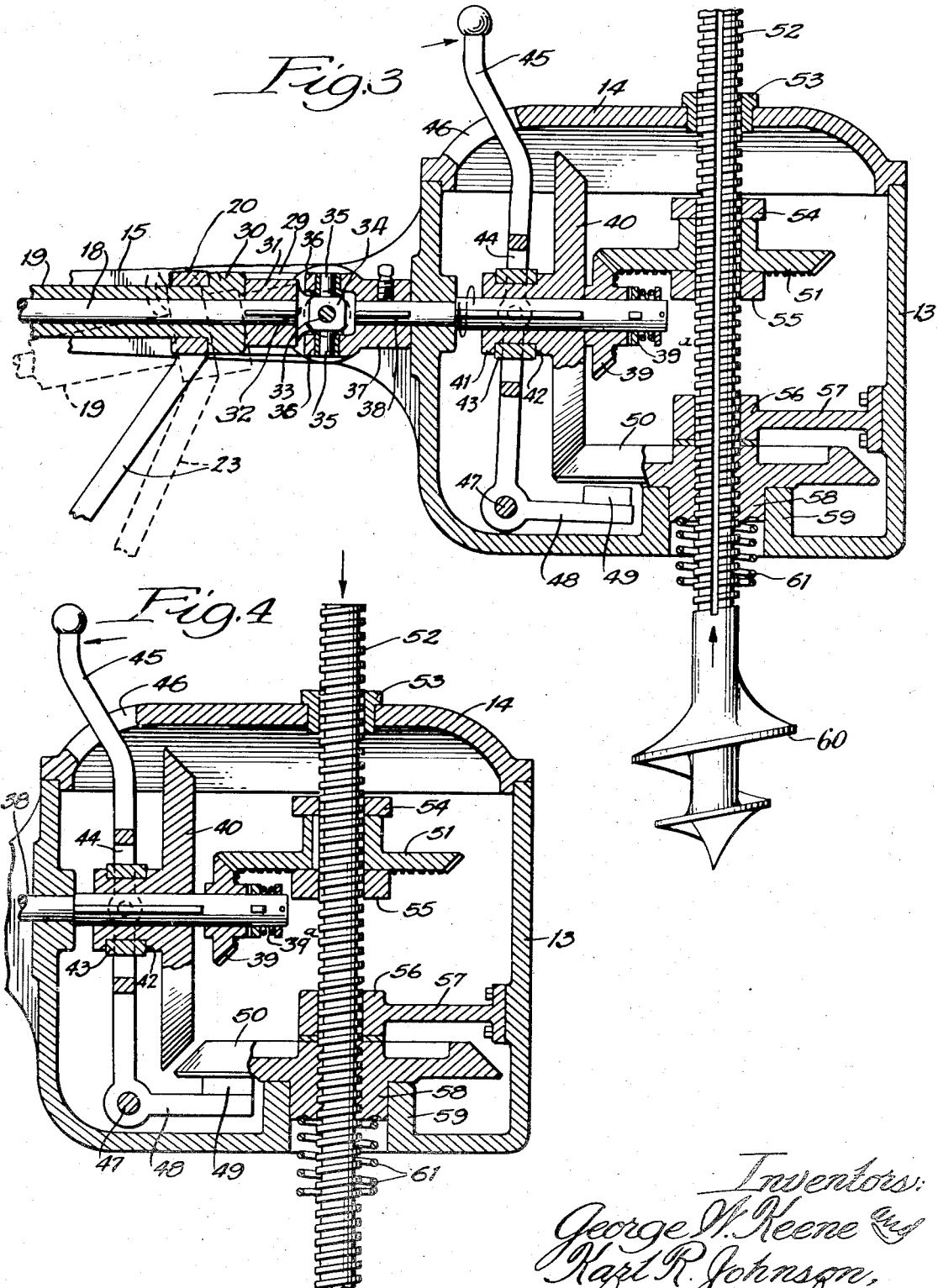

UNITED STATES PATENT OFFICE 2,273,203

POSTHOLE DIGGER

George W. Keene and Karl R. Johnson, Waterman, Ill.; said Johnson assignor to said Keene Application October 1, 1940, Serial No. 359,208

4 Claims. (Cl. 255—22)

The device of the present invention is designed as a self-contained attachment which may be secured to a tractor of standard construction in such a way as to utilize the power take-off of a tractor for the purpose of operating a post hole auger, thus enabling the operator to move the tractor from point to point in the digging of a line of post holes or the like.

The objects of the present invention are to combine the operating mechanism in a compact and convenient manner so that the device may be easily attached to or removed from the frame of the tractor and at the same time to make provision for regulating the speed of the boring operation and the return movement of the drill or auger as occasion may require.

Although the device is designed primarily for use in the digging of post holes, the apparatus without substantial modification might be used for other types of drilling operations in rock, coal, or other relatively hard or dense materials.

Further objects and details will appear from the description of the invention in conjunction with the accompanying drawings, wherein—

Fig. 3 is a sectional elevation through the housing of the drill, taken on line 3—3 of Fig. 1, and showing certain of the driving elements in driving relationship; and Fig. 4 is a similar view showing the same elements in non-engaging relationship.

Figure 1:
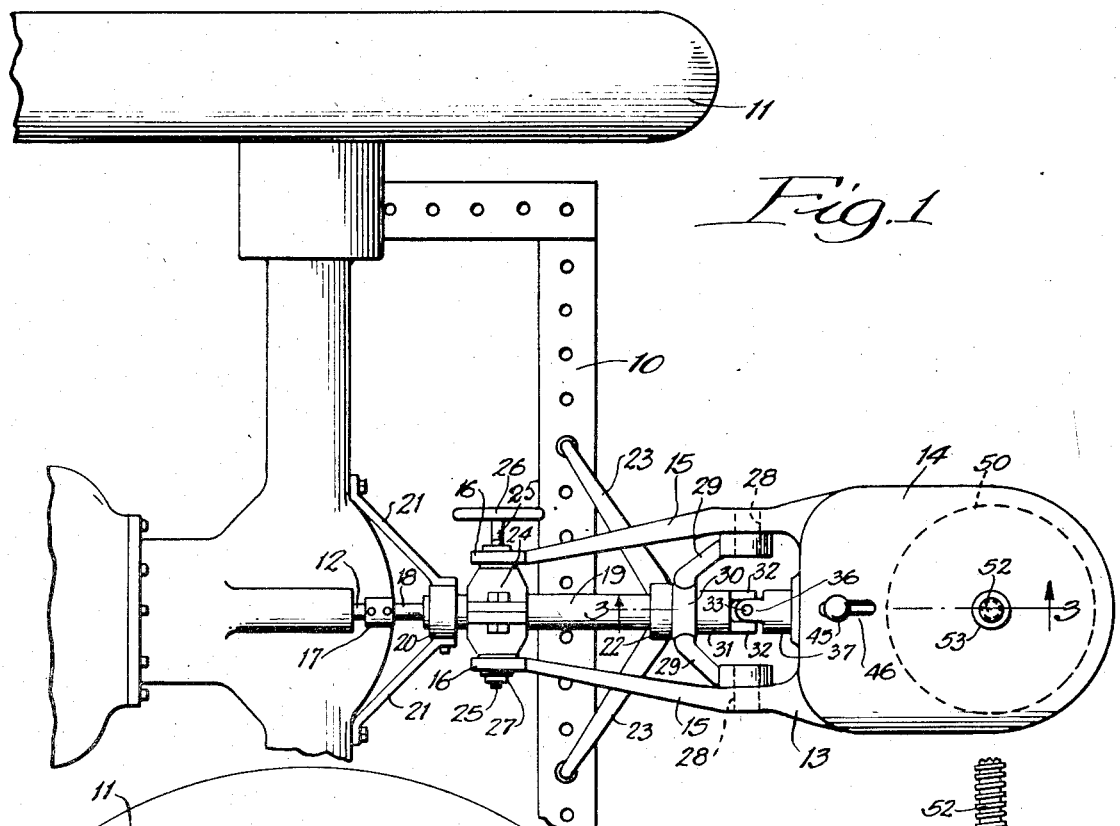
Figure 1 is a plan view of the rear end of a tractor frame showing the appliance of the present invention secured thereto.
Figure 2:
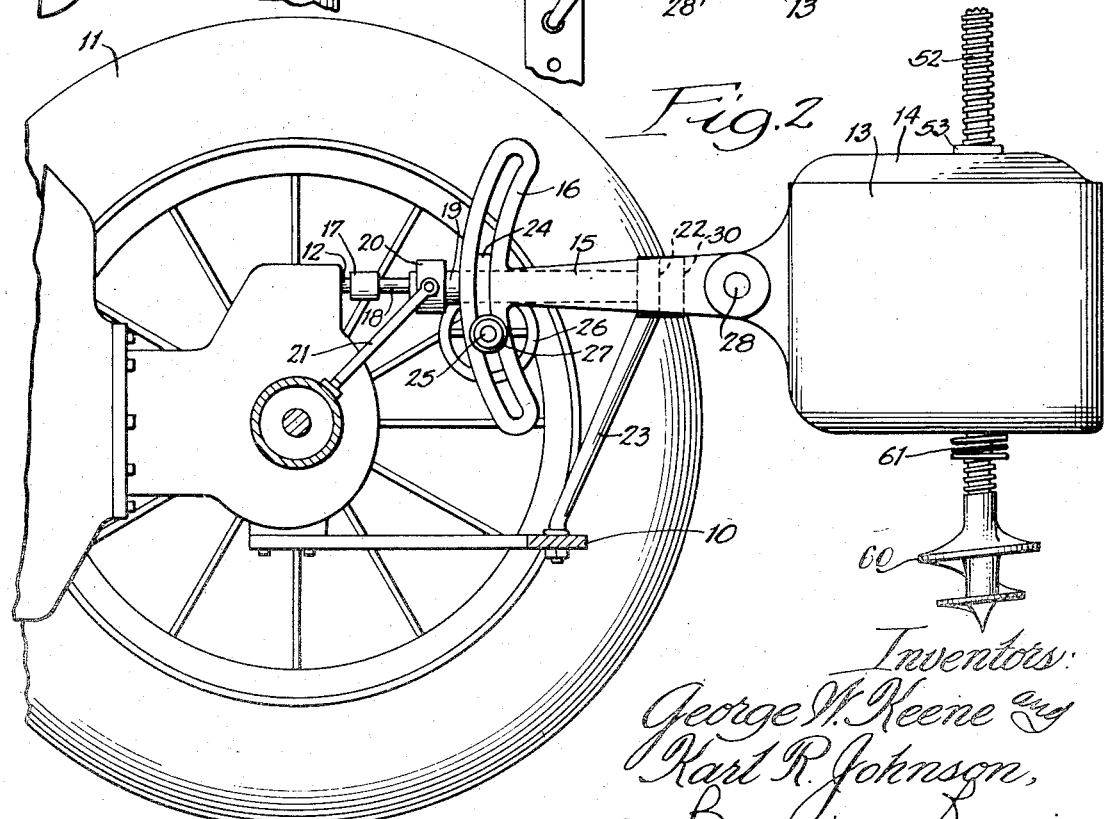
Fig. 2 is a longitudinal sectional elevation through the rear end of the tractor showing the drill in elevation.

The drill of the present invention is secured to the rear cross draft bar 10 of a tractor having driving wheels 11 and a power take-off shaft 12. The drill comprises a box-like rectangular housing 13 which is closed on its top by a cap 14. The housing on its forward side is provided with a pair of rigid forwardly extending arms 15 each of which terminates at its forward end in an arcuate slotted segment 16. The take-off shaft is secured by a coupling 17 to a forward shaft section 18 which is entered through a sleeve 19 supported at its forward end within a collar 20 rigidly secured by bracket arms 21 to a conveniently located portion of the tractor frame.

The sleeve 19 at its rear end is supported within a similar collar 22 carried by downwardly diverging bracket arms 23, the ends of which are entered through apertures in the draft bar 10 of the tractor.

The sleeve 19 near its forward end carries a split spacer head 24 which lies between the arcuate segments 16 and furnishes contact surfaces therefor. The head is clamped on the sleeve 19 by tightening the parts by the rotation of a screw shaft 25 entered through the lower portion of the split spacer head and carrying a hand wheel 26 at one end and a nut 27 at the other. This arrangement permits rotatable adjustment of the spacer head and parts carried thereby on the sleeve as a bearing and also permits the drill housing to be tilted on a transverse horizontal axis and held in adjusted relation by tightening the hand wheel to draw the parts into clamping contact with the slotted segments through which the screw shaft is entered.

The arms 15 are pivoted upon trunnions 28—28 carried by bracket arms 29 which spring from the enlarged rear head 30 forming part of the collar 22 at the rear end of the sleeve 19.

Certain of the parts heretofore described, including the forward shaft section 18, the forward collar 20, the arms 21, the rear collar 22 with the bracket arms 23, and the bracket 30 which carries the trunnions 28, are all normally held tightly clamped upon the sleeve and rigid with the tractor frame and partake of any vertical tilting movements imparted thereto, but in order to maintain the drill housing with its drill in vertical relation to the ground level when the tractor and rigidly connected parts are tilted to the position shown in dotted lines in Fig. 3, the entire drill assembly is adjustable upon the trunnions as an axis, and provision is made for a jointed shaft connection in order to compensate for the tilting of the parts.

The forward shaft section 18 has keyed upon its rear end a collar 31 provided with spaced lugs 32 carrying a pintle 33, upon which is swiveled a block 34 carrying trunnions 35 which extend through lugs 36 on a collar 37 which is keyed upon the forward end of a rear shaft section 38 extending inwardly into the gear box. The pintle 33 is in axial alignment with the trunnions 28 so that the line of axial movement between the gear box and the parts carried by the tractor frame is maintained irrespective of angular adjustments between the forward and rear shaft sections 18 and 38.

The rear shaft section 38 carries a loosely mounted bevel pinion 39 at its inner end, which is normally held fast with the shaft section through the toothed engagement of a spring backed slip clutch 39a which will yield under heavy pressure to prevent breakage of the drill encounters a serious obstruction which prevents its rotation. The shaft section 38 has slidably keyed thereon a bevel faced friction driving disk 40 provided with a hub 41 having a channel 42 which mounts a ring 43 trunnioned within the bifurcated middle portion 44 of a hand lever 45 which projects upwardly through a slot 46 in the cap or cover of the drill housing. The lower end of the hand lever 45 is mounted upon a transversely extending pivot pin 47, and the lever at its lower end terminates in an inwardly projecting arm 48 which carries a brake shoe 49 adapted to frictionally engage the under face of a beveled driven friction disk 50 which coacts with the driving disk 40 in a manner to be presently described.

The driving bevel pinion 39 constantly meshes with a driven bevel gear 51 which is slidably keyed upon a vertically disposed drill shaft 52 which slides freely through a bushing 53 in the cap or cover 14 of the drill housing. The bevel gear 51 is journalled and held in position between upper and lower bridge bars 54—55 to prevent vertical movement.

The drill shaft is further guided through the head 56 of a bracket 57 carried by the housing, and is threaded through the hub 58 of the driven friction disk 50, which hub is journalled within a journal boss 59 on the floor of the housing. The drill shaft terminates at its lower end in a drill or auger 60, and a cushion spring 61 is provided within the boss 59 to prevent violent contact of the auger head with the floor of the housing.

Operation

In operation, the tractor is driven to the desired point for drilling, and if the tractor does not stand upon level ground an adjustment is made to compensate for ground inequalities and bring the drill shaft into proper position for vertical drilling. After the required adjustments have been made, and with the drill shaft and auger head in elevated position, the drilling may begin.

With the parts adjusted as in Fig. 4, and with the friction or brake shoe 49 released, the constantly rotating take-off shaft of the tractor will impart rotation to the drill shaft 52 through the gearing 39—51, and with the friction disk 40 retracted, the hub of the friction disk 50 will be held stationary so that the rotation imparted to the drill shaft through the gears 39—51 will result in a down feeding of the drill to the limit of its movement.

When it is desired to elevate the drill, the friction disks 40 and 50 are brought into engagement as in Fig. 3, and the brake 49 retracted so that rotation will be imparted to the hub 58 in reverse direction to the rotation imparted to the drill shaft through the gearing 39—51, which will result in an upward screwing of the drill shaft at an augmented feeding speed due to the fact that the rotation of the shaft and the hub 58 in opposite directions both combine to rapidly elevate the drill shaft until the auger head engages the cushion spring 61, after which the slippage of the friction disks will hold the drill in elevated position.

The driving mechanism above described is extremely simple and rugged in construction, and at the same time makes adequate provision for the application, through constantly meshed gearing, of sufficient power at reduced speed to drill into hard soil or other resistant material while the return movement, which requires a lesser expenditure of power may be quickly effected by the friction drive, which also at all times permits slippage to compensate for the reverse driving effort applied to the drill shaft.

Furthermore, by the use of a friction brake shoe which engages the friction disk, through the hub of which the drill shaft is threaded, and by the provision of the slip clutch 39a, provision is made for permitting slippage and unclutching of the driving train in the event that a rock or other severe obstruction is encountered, which might cause breakage if the parts were locked immovably, and thus enables the operator to retract the drill shaft, and, if necessary, to slightly adjust the angularity of the line of drilling to avoid the obstruction.

The entire mechanism is a self-contained unit which may be readily secured to tractors of standard construction, and it will be understood that for purposes of illustration merely a particular form of attachment to the tractor has been shown, since any convenient method of mounting the device on the tractor may be employed without departing from the principle of the invention.

We claim:

1. In a drill assembly of the character described and in combination with a tractor having a rigid frame and a power take-off shaft, a gear housing provided with a pair of forwardly extending spaced arms, a sleeve aligned with the take-off shaft and located between said arms and carrying a spacer block to which the forward ends of said arms are adjustably secured to permit tilting of said arms and the gear housing with relation to said sleeve, a forward bracket member supporting the forward end of said sleeve and rigidly secured to the frame of the tractor, a rear bracket member supporting the rear end of said sleeve and rigidly secured to the rear portion of the frame of the tractor to afford immovable support for both ends of said sleeve with respect to the tractor frame, a member adjacent the rear end of said sleeve and carrying trunnions upon which said arms are pivoted near their rear ends, a forward shaft section coupled to the take-off shaft and journalled through the sleeve, a rear shaft section flexibly connected to the forward shaft section at a point in alignment with the axis of the trunnions, a drill shaft entered through the gear housing and provided with a drill at its lower end, and a reversible power transmission train connected with the rear shaft section for imparting rotation to the drill shaft and for selectively imparting down-feeding and up-feeding movements thereto.

2. In a drill assembly of the character described and in combination with a tractor having a rigid frame and a power take-off shaft, a gear housing provided with a pair of forwardly extending spaced arms each terminating in a slotted segment, a sleeve aligned with the take-off shaft and located between said arms and carrying a spacer block to which the forward ends of said arms are adjustably secured by means extending through the slotted segments to permit tilting of said arms and the gear housing with relation to said sleeve, a forward bracket member supporting the forward end of said sleeve and rigidly secured to the frame of the tractor, a rear bracket member supporting the rear end of said sleeve and rigidly secured to the rear portion of the frame of the tractor to afford immovable support for both ends of said sleeve with respect to the tractor frame, a member adjacent the rear end of said sleeve and carrying trunnions upon which said arms are pivoted near their rear ends, a forward shaft section coupled to the take-off shaft and journalled through the sleeve, a rear shaft section flexibly connected to the forward shaft section at a point in alignment with the axis of the trunnions, a drill shaft entered through the gear housing and provided with a drill at its lower end, and a reversible power transmission train connected with the rear shaft section for imparting rotation to the drill shaft and for selectively imparting down-feeding and up-feeding movements thereto.

3. In a drill assembly of the character described, the combination of a gear housing, a mounting for the gear housing adapted to suspend the same from the rear end of a tractor, a threaded drill shaft normally extending vertically through the housing and provided with a drill member at its lower end, a beveled gear fixedly journalled and having the drill shaft slidably keyed therethrough for vertical movement, shaft elements extending through the mounting and into the interior of the housing, a driving beveled pinion fixedly carried at the rear end of said shaft elements and in constant mesh with the gear first described for imparting rotation thereto, a driving bevel faced friction disk slidably keyed upon the inner end of said shaft elements, a driven bevel faced friction disk threaded upon the drill shaft, and a clutch and brake lever pivotally mounted within the housing and configured to engage and shift the driving friction disk, and the lever being provided with an arm carrying a friction shoe adapted to apply braking pressure against the driven friction disk, the lever being adapted to withdraw the driving friction disk from engagement with the driven friction disk and simultaneously apply braking pressure against the driven friction disk.

4. In a drill assembly of the character described, the combination of a gear housing, a mounting for the gear housing adapted to suspend the same from the rear end of a tractor, said mounting including means for adjusting the angle of the housing with respect to the mounting, a threaded drill shaft normally extending vertically through the housing and provided with a drill member at its lower end, a beveled gear fixedly journalled and having the drill shaft slidably keyed therethrough for vertical movement, shaft elements extending through the mounting and into the interior of the housing, a driving beveled pinion fixedly carried at the rear end of said shaft elements and in constant mesh with the gear first described for imparting rotation thereto, a driving bevel faced friction disk slidably keyed upon the inner end of said shaft elements, a driven bevel faced friction disk threaded upon the drill shaft, and a clutch and brake lever pivotally mounted within the housing and configured to engage and shift the driving friction disk, and the lever being provided with an arm carrying a friction shoe adapted to apply braking pressure against the driven friction disk, the lever being adapted to withdraw the driving friction disk from engagement with the driven friction disk and simultaneously apply braking pressure against the driven friction disk.

GEORGE W. KEENE.
KARL R. JOHNSON.